Aug. 16, 1938.     M. RIUSECH     2,127,187
TIRE DEFLATION SIGNAL
Filed Nov. 30, 1936     3 Sheets-Sheet 1
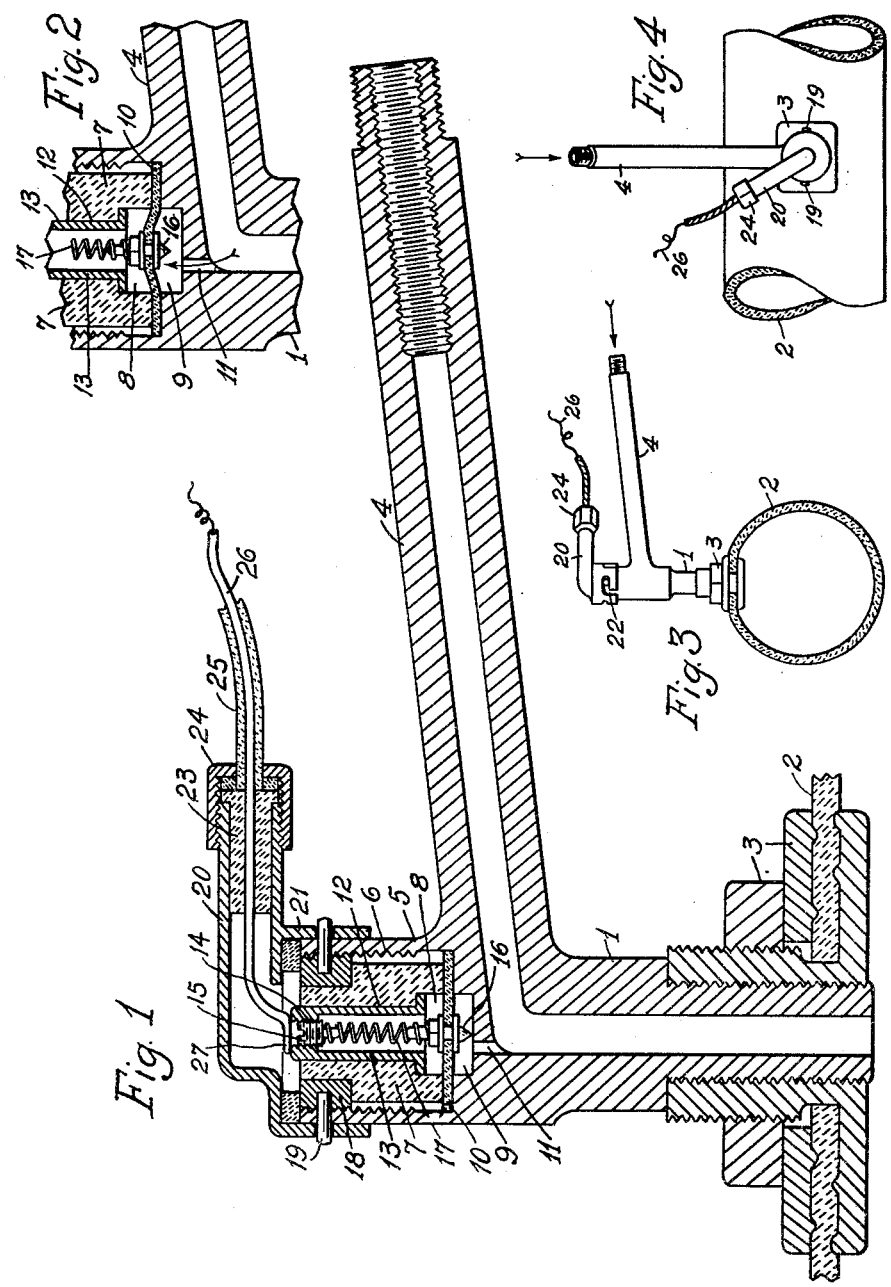
INVENTOR
Medardo Riusech
By
Attorney

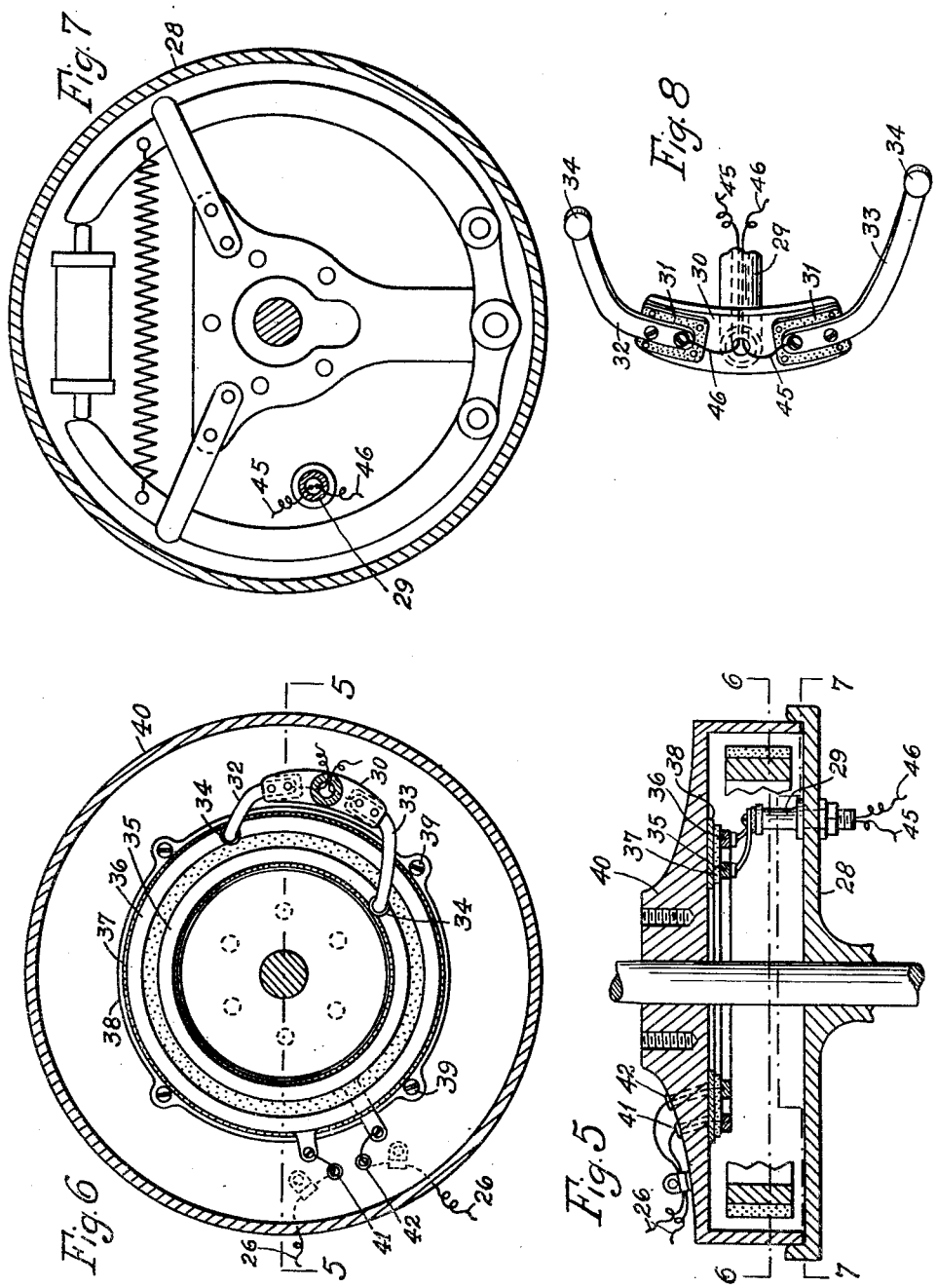

Aug. 16, 1938.  M. RIUSECH  2,127,187
TIRE DEFLATION SIGNAL
Filed Nov. 30, 1936  3 Sheets-Sheet 3
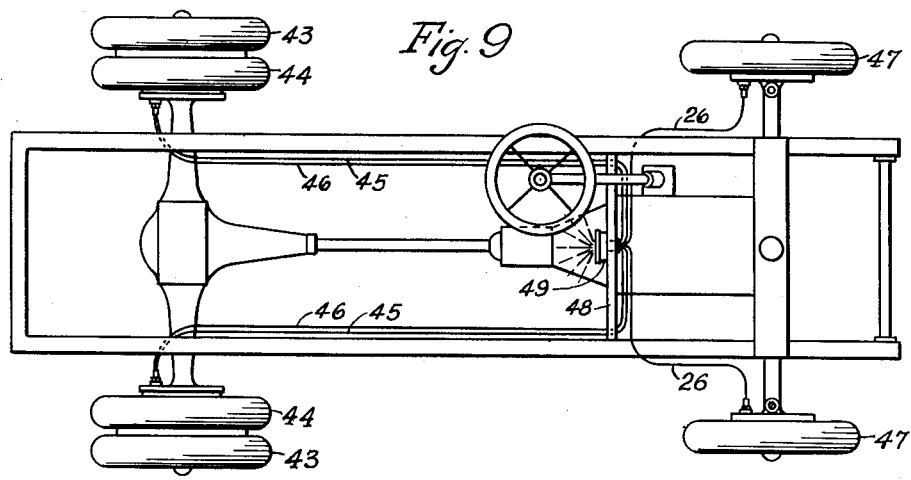
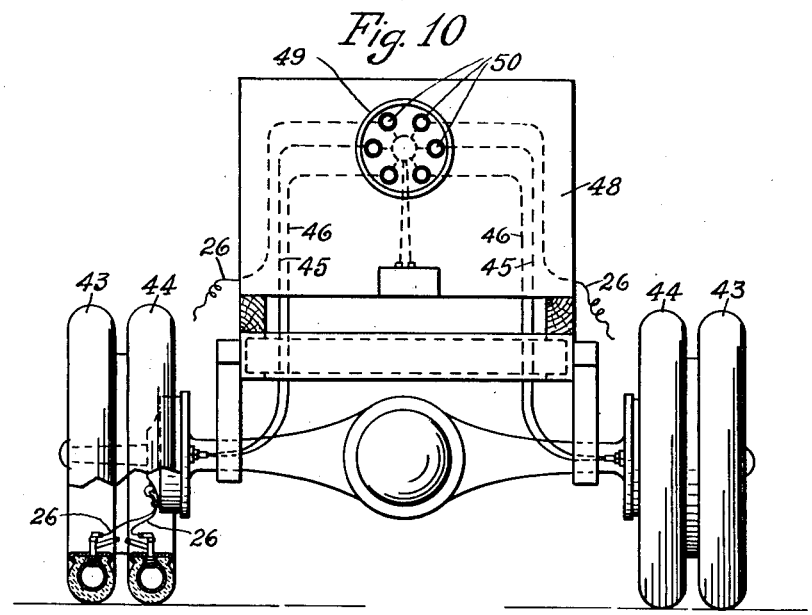
INVENTOR
Medardo Riusech
By [signature]
Attorney Patented Aug. 16, 1938

2,127,187

UNITED STATES PATENT OFFICE 2,127,187

TIRE DEFLATION SIGNAL

Medardo Riusech, Habana, Cuba

Application November 30, 1936, Serial No. 113,515

1 Claim. (Cl. 200—58)

This invention is directed to an improvement in pneumatic tire deflation signaling means wherein the driver of a pneumatic tired vehicle is immediately notified by appropriate signaling means of any deflation of any of the tires of the vehicle.

The primary object of the present invention is the provision of a signaling system involving a signal control circuit for each tire, with the continuity of the circuit interrupted by a predetermined air pressure in the inner tube, the circuit of any particular tire being closed and the signal energized following a deflation of the tire, that is the reduction of the contained air pressure.

A further object of the invention is the provision of a system of the type defined which may be utilized conveniently and successfully with double pneumatic tires, that is with tires duplicated on the respective wheels for additional support and traction, each of the double tires of a wheel being adequately protected independently of the other tire of such wheel so far as the deflation signal is concerned.

A further object of the invention is the provision of means whereby the circuit closing means responsive to tire pressure may be adjusted to render the system operative at any desired pressure variation and thus rendered more or less sensitive in its signaling effect.

The invention is illustrated in the accompanying drawings, in which:

Figure 1 is an enlarged sectional view showing the means for utilizing the air pressure of the tire for controlling the signaling circuit, the circuit controlling means being shown in position to close the circuit.

Figure 2 is a broken sectional view of the circuit control means showing the control means in a position to maintain the circuit open.

Figure 3 is a view in elevation, partly in section, showing the signal circuit control means in position on the inner tube.

Figure 4 is a plan view of the same.

Figure 5 is a transverse section showing the circuiting elements for maintaining the continuity of the circuit between the revolving tire elements and the fixed signal on the vehicle.

Figure 6 is a vertical section of the same on the line 6—6 of Figure 5.

Figure 7 is a vertical section of the same on the line 7—7 of Figure 5.

Figure 8 is a perspective view showing the circuiting means between the rotating drum and the back plate for maintaining the integrity of the circuit between the revolving wheel and the vehicle frame.

Figure 9 is a plan view of the vehicle illustrating the circuiting means and showing the rear wheels as of the double pneumatic tire type.

Figure 10 is a diagrammatic elevation, partly in section, showing the dash and signaling circuits with signals on the dash.

For the purposes of the present invention, the signal circuit for each pneumatic tire, whether of the single or double type, is provided with a circuit control element which is open to, and responsive for circuiting purposes, the pressure of air in the tube. Thus, the more or less conventional filling tube 1 is secured to the inner tube 2 by the conventional means 3 and has its lateral extension 4 terminally provided for the reception of the usual hose by which air is introduced into the inner tube to inflate the same. Of course, the free end of the tube has the usual valve structure which is omitted from the illustration as unnecessary to show.

This tube 1 is formed wth an upstanding hollow extension 5 in line with the connection between the tube 1 and the inner tube, which hollow extension is interiorly threaded at 6. Arranged within the hollow extension 5 is an insulating block 7 which has a diameter somewhat less than the interior diameter of the extension and is formed in its lower face with a depression 8 registering with a similar depression 9 in the upper portion of the tube 1. Bridging the depression 9 and underlying the depression 8 is a flexible diaphragm 10 and as the depression 9 communicates with the air channel in the tube 1 through a reduced opening 11, it is apparent that the central and greater portion of the diaphragm 10 is open to the influence or pressure of the air within the inner tube.

Arranged within an axial opening 12 of the block 7 is a metallic tube 13, the lower end of which is bent laterally to underlie the upper wall of the depression 8. The upper end of the metallic sleeve 13 extends above the block 7 and such upper end is interiorly threaded at 14 to receive a threaded plug 15, which plug is thus vertically adjustable lengthwise the tube 13. Secured in the diaphragm 10 is a contact element 16, preferably pointed at the lower end and between which contact element and the plug 15 is a coil spring 17 which, when free to act, causes the contact element 16 to be brought in contact with the bottom wall of the depression 9 to establish electrical continuity at this point.

A metallic or other rigid annular member 18 is seated in a channel in the upper portion of the insulating block 7, which member 18 is threaded to engage the threaded portion 6 of the extension 5, whereby the insulating block may be held down with sufficient pressure to fix the peripheral edge of the diaphragm. Pins 19 extend outwardly from the annular member 18 and through and beyond the casing 5. A sleeve-like element 20 is provided with a laterally offset depending skirt 21 having bayonet slots 22, whereby the skirt and thereby the sleeve may be removably interlocked with the extension 5 through cooperation with the pins 19.

The sleeve 20 extends laterally of the extension 5 and is terminally provided with an insulating section 23, the ends of which overlie the ends of the sleeve and are secured in position by a cap 24 which additionally secures and holds a flexible insulating sheath 25 for a conductor 26 which extends through the insulating section 23 and has a terminal head 27 to overlie, bear upon and electrically engage the plug 15. This head 27 is of sufficient diameter to engage the upper end of the metallic sleeve 13 if the plug should be depressed below the upper end of such sleeve through desired adjustment of the spring.

The construction described provides for a circuiting condition at the tire which will be responsive to the pressure in the tire. Of course, it is understood that as usual in electrical equipment of vehicles of this type, one side of the circuit is grounded so that only one conductor here is illustrated and treated here as the circuiting element.

It will be noted that so long as a predetermined pressure is maintained within the inner tube 2, such pressure finding its way through the inner tube 2 will elevate the central portion of the diaphragm and so move the contact 16 away from the bottom wall of the depression 9, as illustrated in Figure 2. The circuit is thus broken. Now, if the pressure in the inner tube 2 should fall to an extent to permit the spring 17 to overcome such pressure, the diaphragm 10, and more particularly the contact 16, will be moved downwardly into contact with the bottom of the depression 9 and re-establish continuity of the electrical circuit.

Of course, the elements described are rotating with the wheel and as the signaling elements to be later referred to are mounted on the vehicle, circuiting conditions must be established between the rotating wheel and the relatively fixed vehicle frame. This connection is established through the brake drum, the details of which are shown more particularly in Figures 6 to 8, inclusive.

The conventional backing plate 28 of the conventional drum assembly, which backing plate is fixed of course with respect to the chassis, is provided with a hollow insulating nipple 29 extending therethrough and on the inner side of said plate with respect to the drum the nipple is terminally provided with a plate 30 on one surface of which adjacent the ends are arranged insulating pads 31. Conducting bars 32 and 33 are secured to the insulating pads 31 and these bars are terminally provided with contact disks 34 which bear on contact rings 35 and 36 secured upon an insulating strip 37 overlying an annular plate 38 which is secured at 39 to the inner surface of the brake drum 40. Hollow nipples 41 and 42 extend through the brake drum in line with the rings 35 and 36.

Where double pneumatic wheels are employed, as indicated at 43 and 44 in Figures 9 and 10, it is understood that the mechanism shown in Figure 1 of the drawings is provided for each wheel and that the conductors 26 leading from each of said tires are together led to the brake drum and through the nipples 41 and 42 and terminally connected to the respective contact rings 35 and 36. Corresponding conductors 45 and 46 are terminally connected to the contact bars 32 and 33 led through the insulating nipple 29 and provide signal leads for independent signals. Of course, the electrical continuity is maintained in an obvious manner through the rotating contact rings and the fixed contact bars so that the circuit is complete from the rotating wheel to the fixed signal.

Where only a single tire is employed, as indicated at 47 in Figure 9, there is a single conductor 26 and a single contact ring 35 or 36, a single contact arm 32 or 33 engaging such ring and a single wire leading through the nipple 29 to the signal.

Arranged on the dash 48 or other appropriate part of the vehicle within the vision of the driver is a signal casing 49 in which are arranged signals 50 of any appropriate type which are energized through the conductors previously referred to. For example, conductor 26 for the single pneumatic wheel will lead to one signal while each of the conductors 45 and 46 of a double wheel will lead to a signal. Thus, the deflation of the air pressure of the inner tube of any tire, whether a single tire or a double tire, will permit the closing of the signal energizing circuit and so render the signal visible or audible as the case may be.

The tension of the spring 13 may obviously be adjusted through movement of the plug 15 and as the pressure of this spring will determine the sensitivity of the circuit closer in response to the inner tube pressure, it is apparent that the signal system may be employed for advising the driver of a very small loss of air pressure or may be set to permit a considerably greater loss of pressure before operating the signal. This adjustment, while permitting these noted advantages, is primarily designed to adjust the system for sensitive response to the tire pressure leads in accordance with the pressure demands of the particular tire. Thus, in some tires where the necessary pressure is higher than in others, the spring may obviously be adjusted to maintain the same sensitivity of signal operation without regard to this variation in pressure of different tires.

What is claimed to be new is:

A circuit controlling means for tire deflation signals, including a sleeve integral with the inflation tube and in open communication with the air under pressure within the tube, a diaphragm arranged transverse the sleeve, an insulating block secured within the sleeve and bearing upon and securing the edges of the diaphragm, a conducting sleeve within the block, a plug threaded in one end of the conducting sleeve, a contact carried by the diaphragm, a spring intermediate the plug and diaphragm and serving to hold the contact in electrical engagement with the inflation tube to thereby maintain the grounded side of the circuit when the air pressure within the tube is reduced, the upper end of the insulating block being of reduced diameter, an annular member fitting the portion of reduced diameter of the insulating block and having threaded connection with the sleeve integral with the inflation tube to hold the insulating block in position to secure the edges of the diaphragm, a conductor terminally in electrical contact with the plug, a housing for the conductor having a sleeve extension to slidably fit exteriorly of the sleeve integral with the inflation tube, and pins passing through the sleeve extension, the integral sleeve, and into the annular member to hold the parts in fixed relation while permitting their convenient separation for repair or adjustment.

MEDARDO RIUSECH.